United States Patent [19]
Hoge et al.

[11] Patent Number: 5,942,182
[45] Date of Patent: Aug. 24, 1999

[54] ONE COMPONENT ROOM TEMPERATURE STABLE EPOXY RESIN COMPOSITIONS FOR VARTM/RTM SYSTEMS

[75] Inventors: James E. Hoge; Teruko U. Miyazaki, both of Okemos, Mich.

[73] Assignee: Ciba Specialty Chemicals Corporation, Tarrytown, N.Y.

[21] Appl. No.: 08/999,527

[22] Filed: Sep. 19, 1997

Related U.S. Application Data

[60] Provisional application No. 60/052,863, Jul. 17, 1997, and provisional application No. 60/026,968, Sep. 20, 1996.

[51] Int. Cl.$^6$ .......................... B29C 45/02; B29C 45/14; B29C 70/28

[52] U.S. Cl. .................. 264/510; 264/511; 264/571; 264/257; 264/258; 264/236; 264/347

[58] Field of Search .................................... 264/257, 258, 264/510, 571, 136, 137, 511, 236, 347; 156/296, 285, 286, 275.5; 425/112, 389

[56] References Cited

U.S. PATENT DOCUMENTS

| | | | |
|---|---|---|---|
| 3,784,647 | 1/1974 | Fleming et al. | |
| 4,654,100 | 3/1987 | Yats et al. | 156/296 |
| 5,011,721 | 4/1991 | Decker et al. | |
| 5,315,462 | 5/1994 | Ohkubo et al. | 360/965 |
| 5,356,499 | 10/1994 | Decker et al. | 156/275.5 |
| 5,369,192 | 11/1994 | Ko et al. | 525/484 |
| 5,439,635 | 8/1995 | Seemann | 264/510 |
| 5,480,603 | 1/1996 | Lopez et al. | 264/131 |
| 5,567,499 | 10/1996 | Cundiff et al. | 428/116 |

FOREIGN PATENT DOCUMENTS

| | | |
|---|---|---|
| 0240459 | 10/1987 | European Pat. Off. |
| 2263479 | 7/1993 | United Kingdom. |
| 9735900 | 10/1997 | WIPO. |

OTHER PUBLICATIONS

Derw. Abst of CA 1272346—87–279758 [40].
Derw. Abst of EP 240459—87–279758 [40].
39th International SAMPE Symposium, Apr. 11–14, 1994, "A New Toughened Epoxy Resin for Resin Transfer Molding Applications", Lee et al., pp. 133–144.

Sue et al., Novel Tough RTM Epoxies for Aerospace Composites Applications, pp. 769–770.

Preliminary Technical Bulletin, Shell Chemicals Co., Epoxy Research Resin RSL–1985*/Epon Cursing Agent® W, pp. 1–8, High Performance Aerospace Resin System for Use in Resin Transfer Molding–Filament Winding Processes $26^{th}$ International SAMPE Technical Conference, Oct. 17–20, 1994, "Process Tolerant Resin Transfer Molding Products", McMillan III, pp. 423–436.

$37^{th}$ International SAMPE Symposium, Mar. 9–12, 1992, A New High Temperature Epoxy System for RTM Application, Wang et al, pp. 482–492.

*Primary Examiner*—Mathieu D. Vargot
*Attorney, Agent, or Firm*—David R. Crichton

[57] ABSTRACT

The present invention relates to a process for forming a composite article in a resin transfer molding system. The process includes the steps of providing a fiber preform in a mold, injecting a matrix resin into the mold, allowing the matrix resin to impregnate the fiber preform, and heating the resin impregnated preform to at least about 200° F. for sufficient time to produce at least a partially cured solid article. The matrix resin comprises 1) a liquid epoxy resin component selected from the group of a phenolic novolac epoxy resin,, a cycloaliphatic epoxy resin and mixtures thereof; 2) an epoxy diluent; and 3) at least one latent curing agent that cures only when subjected a temperature of at least about 200° F. The partially cured solid article may be subjected to post-curing operations to produce a final composite article. The present invention also relates to a process for forming a composite article in a vacuum assisted resin transfer mold system.

14 Claims, No Drawings

ONE COMPONENT ROOM TEMPERATURE STABLE EPOXY RESIN COMPOSITIONS FOR VARTM/RTM SYSTEMS

This application claims benefit of provisional application Ser. No. 60/052,863, filed Jul. 17, 1997, and provisional application Ser. No. 60/026,968, filed Sep. 20, 1996.

BACKGROUND OF THE INVENTION

The invention relates to a process for producing composite articles in resin transfer molding systems using, as a one component catalyzed resin, a stable liquid epoxy resin composition containing a latent curing agent.

Resin transfer molding (RTM) and vacuum assisted resin transfer molding (VARTM) are processes for fabricating fiber-reinforced composite articles. The processes involve two basic procedures; 1) fabricating a fiber preform in the shape of a finished article and impregnating the preform with a thermosetting resin, commonly called a matrix resin. The resulting fiber-reinforced composite articles display high strength and low weight. Such articles are used in the aerospace industry and for other applications requiring low weight, high strength materials.

The first step in the RTMNARTM processes is to fabricate a fiber preform in the shape of the desired article. The preform generally comprises a plurality of fabric layers or plies that impart the desired reinforcing properties to a resulting composite article. Once the fiber preform has been fabricated, the preform is placed in a closed cavity mold. The mold is closed and the matrix resin is injected into the mold to initially wet and eventually impregnate the preform. In RTM systems, the matrix resin is injected under pressure into the mold. The matrix resin is cured to produce the final composite article.

In a VARTM system, the preform is covered by flexible sheet or liner. The flexible sheet or liner is clamped onto the mold to seal the preform in an envelope. A catalyzed matrix resin is then introduced into the envelope to wet the preform. A vacuum is applied to the interior of the envelope via a vacuum line to collapse the flexible sheet against the preform. The vacuum draws the resin through the preform and helps to avoid the formation of air bubbles or voids in the finished article. The matrix resin cures while being subjected to the vacuum. The application of the vacuum draws off any fumes produced during the curing process.

The matrix resin in RTM and VARTM systems must possess a very low injection viscosity to allow complete wetting and impregnation of the preform. Typically, RTM and VARTM systems employ "two component" epoxy resin compositions wherein the hardener and resin components must be combined immediately prior to use. Common "one component" epoxy resin compositions must be stored at controlled low temperatures to prevent crosslinking reactions and to extend storage life.

U.S. Pat. No. 5,369,192 discloses epoxy resin-based compositions that may be used as matrix resins in RTM systems. The matrix resins shown therein comprise at least one aromatic polyepoxide, a fluorene-containing epoxide, and a 9,9-bis(aminophenyl)fluorene curing agent. The matrix resin is a heavy paste that must be heated in order to be injected into the RTM system. The resin impregnated preform must be heated to at least 350° F. to cure the epoxy resin-based composition. There is a need for a stable composition having a low viscosity at room temperature and that is curable at temperatures between 200 and 300° F.

British Patent Application 2,263,479 discloses liquid compositions that can be used for resin transfer molding including at least one nitrogen-containing glycidyl compound and a Lewis acid. Examples 5–7 describe a mixture of diglycidyl ether of bisphenol A and a Lewis acid. Each mixture was initially cured at 80° C. and postcured at 200° C. to produce polymers having a glass to rubber transition temperature up to approximately 100° C.

An article entitled "A New High Temperature Epoxy System for RTM Application" by A. Wang et al. similarly describes the use of a tetraglycidyl methylene dianiline epoxy resin in combination with an aromatic amine in RTM systems. The article further describes the use of a tetraglycidyl methylene dianiline epoxy resin and diamino diphenyl sulfone curing agent.

SUMMARY OF THE INVENTION

The present invention relates to a process for producing a composite article in a resin transfer molding system. The process includes the steps of a) providing a fiber preform in a mold; b) injecting a matrix resin into the mold, c) allowing the matrix resin to impregnate the fiber preform; and d) heating the resin impregnated preform to at least about 200° F. for sufficient time to produce at least a partially cured solid article. The matrix resin comprises 1) a liquid epoxy resin component selected from the group of a phenolic novolac epoxy resin, a cycloaliphatic epoxy resin and mixtures thereof 2) an optional epoxy diluent and 3) at least one latent curing agent that cures only when subjected a temperature of at least about 200° F. The partially cured solid article may be subjected to post curing operations to produce a final composite article.

The matrix resin preferably has a maximum Viscosity of about 10,000 centipoise at 25° C.

The phenolic novolac epoxy resin of the matrix resin can be represented by the formula:

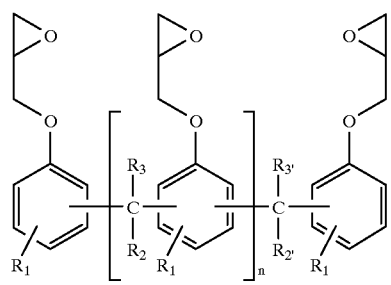

wherein n is 0 to 5, $R_1$, $R_2$, $R_{2'}$, $R_3$, and $R_{3'}$, independently of one another are hydrogen or $C_1$–$C_6$alkyl. Preferably, the epoxy resin is based on 2,4-dimethylene phenol glycidyl ether, 2,6-dimethylene phenol glycidyl ether, or mixtures thereof.

In an alternative embodiment, the present invention relates to a process for forming a composite article in a vacuum assisted resin transfer molding system. The process includes the steps of a) providing a fiber preform in a mold; b) injecting a matrix resin into the mold; c) reducing the pressure within the mold; d) maintaining the mold at about the reduced pressure; e) allowing the matrix resin to impregnate the fiber preform; and f) heating the resin impregnated preform to at least about 200° F. for sufficient time to produce at least a partially cured solid article. The matrix resin comprises 1) a liquid epoxy resin component; 2) an epoxy diluent; and 3) at least one latent curing agent that cures only when subjected a temperature of at least about 200° F. The partially cured solid article can be subjected to post curing operations to produce a final composite article.

The matrix resin preferably has a maximum viscosity of about 10,000 centipoise at 25° C.

The phenolic novolac epoxy resin of the matrix resin can be represented by the formula:

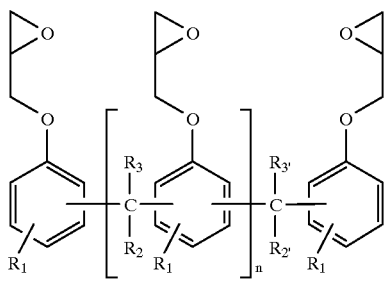

wherein n is 0 to 5, $R_1$, $R_2$, $R_{2'}$, $R_3$, and $R_{3'}$, independently of one another are hydrogen or $C_1$–$C_6$alkyl. The epoxy resin is preferably based on 2,4-dimethylene phenol glycidyl ether, 2,6-dimethylene phenol glycidyl ether, or mixtures thereof.

The present invention also relates to improved methods for forming composite articles in resin transfer and vacuum assisted resin transfer molding systems. The improvement comprises using an epoxy resin composition comprising 1) a liquid, phenolic novolac epoxy resin; 2) an epoxy diluent; and 3) at least one latent curing agent that cures only when subjected to a temperature of at least about 200° F. A resulting partially cured solid article can be subjected to post curing operations to produce a final composite article.

DETAILED DESCRIPTION OF THE INVENTION

The present invention relates to a process for forming a composite article in a resin transfer molding system that employs a one-component catalyzed epoxy resin composition comprising a stable, liquid epoxy resin composition. The epoxy resin composition is preferably a mixture of a liquid epoxy resin component selected from the group of a phenolic novolac epoxy resin, a cycloaliphatic epoxy resin and mixtures thereof, an epoxy diluent component, a latent curing agent component and optionally, fillers, such as defoaming agents, wherein the composition does not contain any curing agents other than latent curing agents.

Resin transfer molding systems are well-known in the art, as described in U.S. Pat. No. 5,369,192, which is incorporated herein by reference. Vacuum assisted resin transfer molding (VARTM) systems are also well-known in the art. Various VARTM systems are described in U.S. Pat. Nos. 5,315,462, 5,480,603 and 5,439,635, which are incorporated herein by reference.

Resin transfer molding systems produce composite articles from resin impregnated preforms. Initially, a preform in the shape of a desired article must be fabricated from composite materials, such as fiberglass, graphite, etc. The fabricated preform is placed in a cavity mold. A matrix resin is then injected into the mold to wet and impregnate the preform. In RTM systems, the matrix resin is injected into the cavity mold under pressure. The resin impregnated preformed is caused to cure by the application of heat and/or catalytic reaction. The resulting solid article is usually subjected to post curing operations to produce a final composite article.

In the VARTM process, the preform is covered by flexible sheet or liner. The flexible sheet or liner is clamped around the mold to seal the preform in an envelope. A catalyzed matrix resin is then introduced into the envelope to wet the preform. A vacuum is applied to the interior of the envelope via a vacuum line to collapse the flexible sheet against the preform and draw the resin through the preform. The resin-impregnated preform is caused to cure by the application of heat and/or catalytic reaction to produce a solid article. The resulting solid article is usually subjected to post curing operations to produce a final composite article.

The epoxy resin composition used in the present invention comprises a) a liquid epoxy resin component selected from the group of a phenolic novolac epoxy resin, a cycloaliphatic epoxy resin and mixtures thereof, b) an epoxy diluent component, c) a latent curing agent, and optionally d) fillers. The liquid phenolic novolac epoxy resin component can be ideally represented by the following formula:

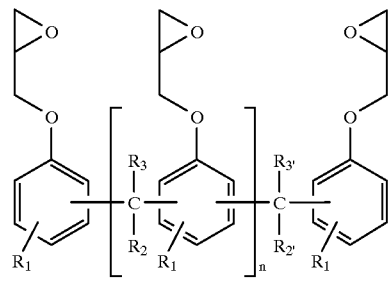

wherein n is 0 to 5, $R_1$, $R_2$, $R_{2'}$, $R_3$, and $R_{3'}$, independently of one another are hydrogen or $C_1$–$C_6$alkyl.

Diglycidyl ether of Bisphenol F (DGEBF) resins can be considered as the simplest epoxy novolac resin (n=0) with $R_2$ and $R_3$ being hydrogen. Liquid DGEBF resins have low viscosities and their viscosities can be further tailored by blending with viscosity reducing epoxy diluents. Low viscosity diglycidyl ethers of bisphenol-A (DGEBA) resins with viscosities @25° C. in the range of 500–9000 cps are commercially available from several manufacturers, e.g. Ciba Specialty Chemicals Corp., Dow Chemical Company, and Shell. Such resins can be blended directly with the latent catalyst without any need for further viscosity reducers to produce room temperature stable one-component systems. Standard DGEBA resins (epoxy equivalent weight 182–192) have viscosities at 25° C. in the range of 11,000 and 14,000 cps. The simplest DGEBA resin have a functionality of 2 can be considered as n=0 with $R_2$ and $R_3$ being methyl. One-component systems for RTM/VARTM application can be formulated by blending standard DGEBA resins with low viscosity DGEBA resins and/or low viscosity DGEBF resins and/or viscosity reducing reactive or non-reactive diluents and the latent hardener.

The cycloaliphatic epoxy resin is conveniently based on a carbon backbone containing one or more than one cycloaliphatic ring and which is free from carbon-carbon double bonds or of aromatic groups. The individual cycloaliphatic rings can contain one or more than one substituent, such as $C_1$–$C_6$alkyl, chloro, bromo or hydroxy substituents and preferably contain 5 to 10 carbon atoms.

Suitable epoxy resins include, but are not limited to, epoxy phenol novolacs such as EPN 1138 (epoxy value 0.55–0.57 eq./100 grams, from Ciba Specialty Chemicals Corporation), EPN 1139 (epoxy value 0.56–0.58 eq./100 grams, from Ciba Specialty Chemicals Corporation), and DEN 438 (epoxy value 0.55–0.57 eq./100 grams from Dow Chemicals). Suitable DGEBF epoxy resins include Epalloy 8230 resin, which has an epoxy equivalent weight of 166–176 and is available from CVC Specialty Chemicals Corporation, located in Mapleshade, N.J. A range of Bisphenol-A based epoxy resins (DGEBA resins) are available from Ciba Specialty Chemicals Corporation. Examples of suitable epoxy resins are liquid compositions based on 2,4-dimethylene phenol glycidyl ether, 2,6-dimethylene phenol glycidyl ether, and mixtures thereof. A polymeric mixture based on 2,4-dimethylene phenol glycidyl ether monomer and 2,6-dimethylene phenol glycidyl ether monomer is preferred. Specific examples of suitable cycloaliphatic epoxy resins are CY 184 (digylcidyl ester of hexahydrophthalic anhydride) which has an epoxy equivalent weight of 161–171 and is available from Ciba Specialty Chemicals Corporation.

Epoxy resins that can be used in the present invention are prepared in conventional fashion by condensing a phenol component and an aldehyde to produce a novolac-type substituted phenolic resin and subsequently glycidyl etherifying the resin with an epihalohydrin. An acid or metal salt catalyst may be provided for the polycondensation reaction. In the etherification reaction, the phenolic resin is dissolved in epichlorohydrin. An aqueous solution of an alkali metal hydroxide is continuously added to the solution during which water and epichlorohydrin are distilled away.

The epoxy resin component is provided in the epoxy resin composition in an amount of about 60% to about 90% by weight, more preferably in an amount of about 80% to about 90% by weight, most preferably in an amount of about 85% by weight of the total epoxy resin composition.

The epoxy diluent component is a glycidyl terminated compound. Especially preferred are compounds containing a glycidyl or β-methylglycidyl groups directly attached to an atom of oxygen, nitrogen, or sulfur. Such resins include polyglycidyl and poly(β-methylglycidyl) esters obtainable by the reaction of a substance containing two or more carboxylic acid groups per molecule with epichlorohydrin, glycerol dichlorohydrin, or β-methylepichlorohydrin in the presence of alkali. The polyglycidyl esters may be derived from aliphatic carboxylic acids, e.g. oxalic acid, succinic acid, adipic acid, sebacic acid, or dimerised or trimerised linoleic acid, from cycloaliphatic carboxylic acids such as hexahydrophthalic, 4-methylhexahydrophthalic, tetrahydrophthalic, and 4-methyltetrahydrophthalic acid, or from aromatic carboxylic acids such as phthalic acid, isophthalic acid, and terephthalic acid.

Other epoxide resins which may be used include polyglycidyl and poly(β-methylglycidyl) ethers obtainable by the reaction of substances containing per molecule, two or more alcoholic hydroxy groups, or two or more phenolic hydroxy groups, with epichlorohydrin, glycerol dichlorohydrin, or β-methylepichlorohydrin, under alkaline conditions or, alternatively, in the presence of an acidic catalyst with subsequent treatment with alkali. Such polyglycidyl ethers may be derived from aliphatic alcohols, for example, ethylene glycol and poly(oxyethylene)glycols such as diethylene glycol and triethylene glycol, propylene glycol and poly(oxypropylene) glycols, propane-1,3-diol, butane-1,4-diol, pentane-1,5-diol, hexane-1,6-diol, hexane-2,4,6-triol, glycerol, 1,1,1-trimethylolpropane, and pentaerythritol; from cycloaliphatic alcohols, such as quinitol, 1,1-bis (hydroxymethyl)cyclohex-3-ene, bis(4-hydroxycyclohexyl) methane, and 2,2-bis(4-hydroxycyclohexyl)-propane; or from alcohols containing aromatic nuclei, such as N,N-bis-(2-hydroxyethyl)aniline and 4,4'-bis(2-hydroxyethylamino) diphenylmethane. Preferably the polyglycidyl ethers are derived from substances containing two or more phenolic hydroxy groups per molecule, for example, resorcinol, catechol, hydroquinone, bis(4-hydroxyphenyl)methane, 1,1, 2,2-tetrakis(4-hydroxyphenyl)ethane, 4,4'-dihydroxydiphenyl, bis(4-hydroxyphenyl)sulphone, and especially, phenol-formaldehyde or cresol-formaldehyde novolac resins, 2,2-bis(4-hydroxyphenyl)propane (otherwise known as bisphenol A), and 2,2-bis(3,5-dibromo-4-hydroxyphenyl)-propane.

There may further be employed poly(N-glycidyl) compounds, such as are, for example, obtained by the dehydrochlorination of the reaction products of epichlorohydrin and amines containing at least two hydrogen atoms directly attached to nitrogen, such as aniline, n-butylamine, bis(4-aminophenyl)methane, bis(4-aminophenyl) sulphone, and bis(4-methylaminophenyl)methane. Other poly(N-glycidyl) compounds that may be used include triglycidyl isocyanurate, N,N'-diglycidyl derivatives of cyclic alkylene ureas such as ethyleneurea and 1,3-propyleneurea, and N,N'-diglycidyl derivatives of hydantoins such as 5,5-dimethylhydantoin.

Epoxide resins obtained by the epoxidation of cyclic and acrylic polyolefins may also be employed, such as vinylcyclohexene dioxide, limonene dioxide, dicyclopentadiene dioxide, 3,4-epoxydihydrodicyclopentadienyl glycidyl ether, the bis(3,4-epoxydihydrodicyclopentadienyl) ether of ethylene glycol, 3,4-epoxycyclohexylmethyl 3,4'-epoxycyclohexanecarboxylate and its 6,6'-dimethyl derivative, the bis(3,4-epoxycyclohexanecarboxylate) of ethylene glycol, the acetal formed between 3,4-epoxycyclohexanecarboxaldehyde and 1,1-bis (hydroxymethyl)-3,4-epoxycyclohexane, bis(2,3-epoxycyclopentyl)ether, and epoxidized butadiene or copolymers of butadiene with ethylenic compounds such as styrene and vinyl acetate.

A preferred epoxy diluent component may be represented by the following formula:

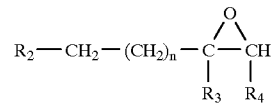

wherein n is 0 to 5, more preferably n is 2 or 3, $R_2$ is hydrogen or a glycidyl radical, and $R_3$ and $R_4$, independently of one another are hydrogen or methyl. Suitable aliphatic or aromatic epoxy resin diluents are butanediol diglycidyl ether, diglycidyl ether of ortho toluidine, diglycidyl ether of neopentyl glycol. An especially preferred epoxy diluent is 1,4-diglycidyloxybutane. Epoxy diluent components are commercially available, such DY 026 SP, from Ciba Specialty Chemicals Corporation.

The epoxy diluent component is provided in the epoxy resin composition in an amount of about 5% to about 12% by weight, more preferably in an amount of about 8% to about 10% by weight, most preferably in an amount of about 9% by weight of the total epoxy resin composition.

The latent curing agent component preferably is activated at temperatures between 180° F. and 250° F. Examples of suitable latent curing agents include boron trichloride amine complexes. The most preferred latent curing agent is a boron trichloride amine complex available under the tradename DY 9577, from Ciba Specialty Chemicals Corporation, Tarrytown, N.Y. Many boron trichloride amine complexes are commercially available.

The latent curing agent component is provided in the epoxy resin composition in an amount of about 1% to about 10% by weight, more preferably in an amount of about 3% to about 7% by weight, most preferably in an amount of about 5% by weight of the total epoxy resin composition.

The composition preferably contains a defoaming agent.

An important aspect of the present invention is that the composition is stable at room temperature and is capable of curing at a temperature of between 200 and 250° F. Accordingly, the composition does not contain any curing agent, other than the latent curing agent or mixture of latent curing agents, that would reduce stability or lower the curing temperature. Additionally, a further aspect of the present invention is that the composition has a viscosity of about 10,000 centipoise at 25° C., 800 centipoise at 50° C. or 200 centipoise at 70° C.

The compositions described above are relatively easy to process, have long term room temperature storage stability, produce cured compositions having glass transition temperatures from low (130° F.) to high (300–320° F.), cure at a temperature of 200° F., and have a long latency time even at 70° C. The invention will be further described by reference to the following non-limiting examples.

EXAMPLE 1

Preparation of Compositions—Preferred Ranges

| Components | (parts by weight) |
|---|---|
| Epoxy phenol novolac resin[1] | 60–90 |
| Butanediol diglycidyl ether | 5–12 |
| Boron trichloride amine complex[2] | 1–10 |
| Defoaming agent | .01–.05 |

[1]The epoxy phenol novolac resin is a mixture of the products EPN 1139 (epoxy value 0.56–0.58 eq./100 grams, available from Ciba Specialty Chemicals Corporation) and DEN 438 (epoxy value 0.55–0.57 eq./100 grams available from Dow Company).
[2]The boron trichloride amine complex is sold under the name DY 9577 (available from Ciba Specialty Chemicals Company).

The components listed above are blended together in the following proportions:

| Components | Resin A (parts by weight) |
|---|---|
| Epoxy phenol novolac resin[3] | 85.5 |
| Butanediol diglycidyl ether | 9.48 |
| Boron trichloride amine complex[4] | 5 |
| Defoaming agent | 0.02 |

[3]The epoxy phenol novolac resin is a mixture of the products EPN 1139 (epoxy value 0.56–0.58 eq./100 grams, available from Ciba Specialty Chemicals Corporation) and DEN 438 (epoxy value 0.55–0.57 eq./100 grams available from Dow Company). The mixture contains 72.2% by weight of EPN 1139 and 27.8% by weight of DEN 438.
[4]The boron trichloride amine complex is sold under the name DY 9577 (available from Ciba Specialty Chemicals Company).

The epoxy novolacs are pre-heated before addition to aid in blending.

Physical characteristics of uncured resin

TABLE 1

| | Resin A |
|---|---|
| Color | Light Amber |
| Viscosity, Spindle #5: @ 20 RPM | 10,400 cps. |
| Specific gravity: | 1.194 |

TABLE 1-continued

| | Resin A |
|---|---|
| Gel time, Thin film: cure @ 150° C. | 3.1 minutes |
| DSC onset temperature: | 126.58° C. |

TABLE 2

Cured neat resin properties*

| | Resin A |
|---|---|
| DMA $T_g$ (° C.) | 305.9° F. |
| Tensile Strength (psi) | 4,533 |
| Tensile Modulus (psi) | 489,790 |
| Tensile % Elongation | 1.1 |

*System cured 2 hours @ 250° F. + 3 hours @ 350° F.
NOTE: System self-support cures in thin layer sections with a 16 hr. @ 200° F. cure. Full heat cure is needed for ultimate physical properties.

EXAMPLE 2

Liquid systems containing Resin A are subjected to constant heating in an oven and periodically checked for increasing viscosity. An increase in viscosity of less than 10% is indicative of a stable resin composition. No noticeable change in the handling characteristics in the liquid systems are observed at 125° F. for 4 weeks, at 104° F. for greater than 4 months, and at 78° F. for 1 year.

EXAMPLE 3

Preparation of Compositions Based on DGEBF Resin—Preferred Ranges

| Components | (parts by weight) |
|---|---|
| DGEBF resin | 97–70 |
| Epoxy diluent | 0–25 |
| Boron trichloride amine complex | 1–10 |
| Defoaming agent | .01–.05 |

Resin B was formulated as follows.

| Composition of Resin B | |
|---|---|
| Components | parts by weight |
| DGEBF Epoxy resin[5] | 90.5 |
| Butanediol diglycidyl ether | 4.75 |
| Boron trichloride amine complex | 4.70 |
| Defoaming agent | 0.05 |

[5]The DGEBF epoxy resin used was Epalloy 8230 resin having an epoxy equivalent weight of 166–176 available from CVC Specialty Chemicals Corporation, located in Mapleshade, N.J., USA.

TABLE 3

| | Resin B |
|---|---|
| Physical characteristics of uncured resin | |
| Viscosity at 75° F., Spindle #3 @ 20 RPM | 7200 cps. |
| Viscosity at 125° F., Spindle #3 @ 20 RPM | 275 cps |
| DSC onset temperature | 121.3° C. |

TABLE 3-continued

|  | Resin B |
| --- | --- |
| Cured neat resin properties* | |
| DMA $T_g$ (° C.) | 134° C. (273° F.) |
| Tensile Strength (psi) | 3716 |
| Tensile Modulus (psi) | 432,000 |
| Tensile % Elongation | 1.0 |

*System cured for 10 hours @ 200° F. + 4 hours @ 300° F.

EXAMPLE 4

Preparation of Compositions Containing DGEBA and Other Resins—Preferred Ranges

| Components | (parts by weight) |
| --- | --- |
| Standard DGEBA resin | 25–75 |
| Low viscosity DGEBF resin | 0–60 |
| Low viscosity DGEBA resin | 0–60 |
| Low viscosity epoxy Diluent | 0–40 |
| Boron trichloride amine complex | 1–10 |
| Defoaming agent | .01–.05 |

Resin D was formulated as follows.

| Composition of Resin C | |
| --- | --- |
| Components | parts by weight |
| Standard DGEBA resin, GY 6010 | 47.5 |
| DGEBF resin Epalloy 8230 | 43 |
| Low viscosity DGEBA resin | 0 |
| Butanediol diglycidyl ether | 4.75 |
| Boron trichloride amine complex[2] | 4.70 |
| Defoaming agent | 0.05 |

TABLE 4

|  | Resin C |
| --- | --- |
| Physical characteristics of uncured resin | |
| Viscosity at 75° F., Spindle #4 @ 20 RPM | 4500 cps. |
| Viscosity at 125° F., Spindle #4 @ 20 RPM | 300 cps |
| DSC onset temperature: | N/A |
| Cured neat resin properties* | |
| DMA E" $T_g$ (° C.) | 158° C. (316° F.) |
| Tensile Strength (psi) | 5594 |
| Tensile Modulus (psi) | 401,011 |
| Tensile % Elongation | 1.5 |

*System cured for 10 hours @ 200° F. + 4 hours @ 300° F.

EXAMPLE 5

Preparation of Compositions—Preferred Ranges

| Components | (parts by weight) |
| --- | --- |
| Cycloaliphatic resin | 99–40 |
| Other epoxy resins such DGEBA, DGEBF etc. | 0–60 |
| Boron trichloride amine complex | 1–10 |
| Defoaming agent | .01–.05 |

Resin D was formulated as follows.

| Composition of Resin D | |
| --- | --- |
| Components | parts by weight |
| Cycloaliphatic epoxy resin CY 184[7] | 95 |
| Boron trichloride amine complex | 4.95 |
| Defoaming agent | 0.05 |

[7]The cycloaliphatic epoxy resin with epoxy equivalent weight of 161–178 is available from Ciba Specialty Chemicals Corporation.

TABLE 5

|  | Resin D |
| --- | --- |
| Physical characteristics of uncured resin | |
| Viscosity at 75° F., Spindle #4 @ 20 RPM | 900 cps |
| Viscosity at 125° F., Spindle #4 @ 20 RPM | 150 cps |
| DSC onset temperature: | 122.5° C. |
| Cured neat resin properties* | |
| DMA E" $T_g$ (° C.) | 128.5° C. (263.3° F.) |
| Tensile Strength (psi) | 11,556 |
| Tensile Modulus (psi) | 485,183 |

*System cured for 10 hours @ 200° F. + 4 hours @ 300° F.

EXAMPLE 6

Preparation of Compositions—Preferred Ranges

| Components | (parts by weight) |
| --- | --- |
| Cycloaliphatic resin | 99–40 |
| Other epoxy resins such DGEBA, DGEBF, Epoxy Novolacs etc. | 0–60 |
| Boron trichloride amine complex | 1–10 |
| Defoaming agent | .01–.05 |

Resin E was formulated as follows.

Composition of Resin E

| Components | parts by weight |
| --- | --- |
| Cycloaliphatic epoxy resin CY 184[7] | 47.5 |
| Epoxy phenol novolac resin[8] | 47.5 |
| Boron trichloride amine complex | 4.95 |
| Defoaming agent | 0.05 |

[7]The cycloaliphatic epoxy resin with epoxy equivalent weight of 161–178 is available from Ciba Specialty Chemicals Corporation.
[8]The epoxy phenol novolac resin is a mixture of the products EPN 1139 (epoxy value 0.56–0.58 eq./100 grams, available from Ciba Specialty Chemicals Corporation) and DEN 438 (epoxy value 0.55–0.57 eq./100 grams available from Dow Company). The mixture contains 72.2% by weight of EPN 1139 and 27.8% by weight of DEN 438.

TABLE 6

|  | Resin E |
| --- | --- |
| Physical characteristics of uncured resin | |
| Viscosity at 75° F., Spindle #4 @ 20 RPM | 2900 cps |
| Viscosity at 125° F., Spindle #4 @ 20 RPM | 250 cps |
| DSC onset temperature: | 123° C. |
| Cured neat resin properties* | |
| DMA E" $T_g$ (° C.) | 134° C. (273.2° F.) |

TABLE 6-continued

|  | Resin E |
| --- | --- |
| Tensile Strength (psi) | 7748 |
| Flex Strength (psi) | 17,059 |
| Flex Modulus (psi) | 433,408 |

*System cured for 10 hours @ 200° F. + 4 hours @ 350° F.

While the invention has been illustrated by means of various examples, it will be apparent that further modifications and variations are possible without departing from the spirit and scope of the invention, which is defined by the appended claims.

We claim:

1. A process for forming a composite article in a resin transfer molding system comprising:
   a) providing a fiber preform in a mold;
   b) injecting a matrix resin into the mold, wherein the matrix resin consists essentially of
      1) a liquid, phenolic novolac epoxy resin
      2) an epoxy diluent and
      3) at least one boron trichloride amine complex latent curing agent that cures only when subjected a temperature of at least about 200° F.;
   c) allowing the matrix resin to impregnate the fiber preform; and
   d) heating the resin impregnated preform to at least about 200° F. for sufficient time to produce at least a partially cured solid article.

2. The process according to claim 1 further comprising e) subjecting the partially cured solid article to post curing operations to produce a final composite article.

3. The process according to claim 1 wherein the matrix resin has a maximum viscosity of about 10,000 centipoise at 25° C.

4. The process according to claim 1 wherein the liquid, phenolic novolac epoxy resin is represented by the general formula:

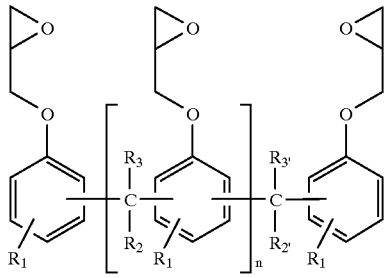

wherein n is 0 to 5, $R_1$, $R_2$, $R_{2'}$, $R_3$, and $R_{3'}$, independently of one another are hydrogen or $C_1$–$C_6$alkyl.

5. The process according to claim 1 wherein the epoxy resin is based on 2,4-dimethylene phenol glycidyl ether, 2,6-dimethylene phenol glycidyl ether, or mixtures thereof.

6. A process for forming a composite article in a vacuum assisted resin transfer molding system comprising:
   a) providing a fiber preform in a mold;
   b) injecting a matrix resin into the mold, wherein the matrix resin consists essentially of
      1) a liquid, phenolic novolac epoxy resin
      2) an epoxy diluent and
      3) at least one boron trichloride amine complex latent curing agent that cures only when subjected a temperature of at least about 200° F.;
   c) reducing the pressure within the mold;
   d) maintaining the mold at about the reduced pressure;
   e) allowing the matrix resin to impregnate the fiber preform; and
   f) heating the resin impregnated preform to at least about 200° F. for sufficient time to produce at least a partially cured solid article.

7. The process according to claim 6 further comprising g) subjecting the partially cured solid article to post curing operations to produce a final composite article.

8. The process according to claim 6 wherein the matrix resin has a maximum viscosity of about 10,000 centipoise at 25° C.

9. The process according to claim 6 wherein the liquid, phenolic novolac epoxy resin is represented by the general formula:

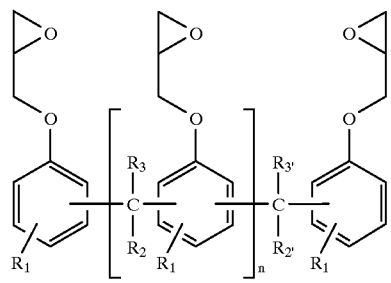

wherein n is 0 to 5, $R_1$, $R_2$, $R_{2'}$, $R_3$, and $R_{3'}$, independently of one another are hydrogen or $C_1$–$C_6$alkyl.

10. The process according to claim 6 wherein the epoxy resin is based on 2,4-dimethylene phenol glycidyl ether, 2,6-dimethylene phenol glycidyl ether, or mixtures thereof.

11. In an improved method for forming a composite article in a resin transfer molding system including the steps of a) providing a fiber preform in a mold; b) injecting a matrix resin into the mold; c) allowing the matrix resin to impregnate the fiber preform; and d) heating the resin impregnated preform to at least about 200° F. for sufficient time to produce at least a partially cured solid article wherein the improvement comprises using an epoxy resin composition consisting essentially of
   1) a liquid, phenolic novolac epoxy resin
   2) an epoxy diluent and
   3) at least one boron trichloride amine complex latent curing agent that cures only when subjected a temperature of at least about 200° F.

12. The method according to claim 11 further comprising e) subjecting the partially cured solid article to post curing operations to produce a final composite article.

13. In an improved method for forming a composite article in a vacuum assisted resin transfer molding system including the steps of a) providing a fiber preform in a mold; b) injecting a matrix resin into the mold; c) reducing the pressure within the mold; d) maintaining the mold at about the reduced pressure; e) allowing the matrix resin to impregnate the fiber preform; and f) heating the resin impregnated preform to at least about 200° F. for sufficient time to produce at least a partially cured solid article wherein the improvement comprises using an epoxy resin composition consisting essentially of 1) a liquid, phenolic novolac epoxy resin
2) an epoxy diluent and
3) at least one boron trichloride amine complex latent curing agent that cures only when subjected a temperature of at least about 200° F.

14. The process according to claim 13 further comprising
g) subjecting the partially cured solid article to post curing operations to produce a final composite article.

* * * * *

UNITED STATES PATENT AND TRADEMARK OFFICE
CERTIFICATE OF CORRECTION

PATENT NO. : 5,942,182
DATED : August 24, 1999
INVENTOR(S) : James E. Hoge, et. al.

It is certified that error appears in the above-identified patent and that said Letters Patent is hereby corrected as shown below:

Title page, item [75], inventors, should read: James E. Hoge; Teruko U. Miyazalki; Mahesh A. Kotnis, all of Okemos, Mich.--

Signed and Sealed this

Fifth Day of December, 2000

Attest:

Q. TODD DICKINSON

*Attesting Officer*          *Director of Patents and Trademarks*